US010853796B1

United States Patent
Nolte et al.

(10) Patent No.: US 10,853,796 B1
(45) Date of Patent: Dec. 1, 2020

(54) AUTOMATED APPLICATION WORKFLOWS BASED ON SIGNAL DETECTION

(71) Applicant: UIPCO, LLC, San Antonio, TX (US)

(72) Inventors: Matthew David Nolte, San Antonio, TX (US); William Michael Webb, San Antonio, TX (US); Shiloh Huff, San Antonio, TX (US); Shane J. London, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 651 days.

(21) Appl. No.: 15/386,358

(22) Filed: Dec. 21, 2016

Related U.S. Application Data

(60) Provisional application No. 62/270,956, filed on Dec. 22, 2015.

(51) Int. Cl.
*G06Q 40/00* (2012.01)
*G06Q 20/34* (2012.01)

(52) U.S. Cl.
CPC ......... *G06Q 20/354* (2013.01); *G06Q 20/341* (2013.01); *G06Q 20/352* (2013.01)

(58) Field of Classification Search
CPC .... G06Q 40/10; G06Q 20/354; G06Q 20/341; G06Q 20/352
See application file for complete search history.

(56) References Cited

U.S. PATENT DOCUMENTS

| | | | |
|---|---|---|---|
| 8,868,458 B1* | 10/2014 | Starbuck | G06Q 40/00 705/35 |
| 9,734,498 B2* | 8/2017 | Itwaru | G06Q 20/4012 |
| 2005/0187873 A1* | 8/2005 | Labrou | G06Q 20/02 705/40 |
| 2012/0101887 A1* | 4/2012 | Harvey | G06Q 10/00 705/14.23 |
| 2014/0006194 A1* | 1/2014 | Xie | G06Q 20/3278 705/21 |
| 2014/0222670 A1* | 8/2014 | Concannon | G06Q 20/3278 705/41 |
| 2015/0302398 A1* | 10/2015 | Desai | G06F 8/60 705/41 |
| 2015/0332254 A1* | 11/2015 | Desai | G06F 8/60 705/41 |

(Continued)

OTHER PUBLICATIONS

AOC Solutions Unveils EnCompass Mobile, Business Wire; New York [New York]Feb. 27, 2013. (Year: 2013).*

*Primary Examiner* — Lalita M Hamilton
(74) *Attorney, Agent, or Firm* — Perkins Coie LLP

(57) ABSTRACT

Techniques are described for automatically presenting workflow(s) in an application based at least partly on detected signal(s). A radio-frequency signal may be emitted from a transceiver included in, attached to, or otherwise associated with a payment card. The signal may be received by a transceiver of a user device when the card is in proximity to the device and, in response, an application may launch a workflow including one or more pages of content in the application. The launched workflow may include functionality for activating a payment card, based on a determination that the card is not yet activated. The launched workflow may also include functionality for viewing account information, based on a determination that the card is already activated.

20 Claims, 6 Drawing Sheets

(56) References Cited

U.S. PATENT DOCUMENTS

| | | | |
|---|---|---|---|
| 2016/0189142 A1* | 6/2016 | Chandru | G06Q 20/322 |
| | | | 705/39 |
| 2016/0253651 A1* | 9/2016 | Park | G07F 9/023 |
| | | | 705/39 |
| 2017/0083882 A1* | 3/2017 | Kim | G06Q 20/102 |
| 2018/0268403 A1* | 9/2018 | Guglani | H04L 9/3215 |

* cited by examiner

AUTOMATED APPLICATION WORKFLOWS BASED ON SIGNAL DETECTION

CROSS-REFERENCE TO RELATED APPLICATION

The present disclosure is related to, and claims priority to, U.S. Provisional Patent Application Ser. No. 62/270,956, titled "Automated Application Workflows Based On Signal Detection," which was filed on Dec. 22, 2015, the entirety of which is hereby incorporated by reference into the present disclosure.

BACKGROUND

Financial service providers such as banks, insurance companies, and so forth may provide a mobile application, through which customers can use a mobile device to access account data, request account activities, or view other information. However, applications designed for larger devices, such as desktop computers, may be difficult for users to view and manipulate on smaller, mobile devices with limited display size and/or limited interface functionality.

SUMMARY

Implementations of the present disclosure are generally directed to the automated presentation of workflow(s) in an application based at least partly on detected signal(s). More particularly, implementations of the present disclosure are directed to the automated presentation of workflows for activating a payment card and/or viewing account information, based at least partly on detecting radio-frequency signal(s) that are emitted from a payment card and/or that identify the payment card.

In general, innovative aspects of the subject matter described in this specification can be embodied in methods that includes actions of: receiving, through a transceiver component of a user device, a signal that includes a card identifier (ID) of a payment card; determining the card ID from the signal; determining a status of the payment card corresponding to the card ID; and based at least partly on the status of the payment card, presenting at least a portion of a workflow in an application executing on the user device.

Implementations can include one or more of the following features: presenting the workflow further comprises presenting a card activation workflow responsive to the status of the payment card being currently inactive; presenting the workflow further comprises presenting an account information workflow responsive to the status of the payment card being currently active; determining the status of the payment card further comprises: sending a status request to a card service executing remotely, the status request including the card ID; and receiving the status from the card service in response to the status request; the signal is transmitted from a radio-frequency transmitter included in the payment card; the signal is transmitted from a near field communication (NFC) transmitter included in the payment card; sending an activation request to a card service executing remotely, the activation request including the card ID; receiving a notification from the card service in response to the request, the notification indicating that the payment card is activated for a period of time; or the payment card is inactive prior to sending the activation request, based on a determination that a location of the user device is outside a typical area of travel.

Other implementations of any of the above aspects include corresponding systems, apparatus, and computer programs that are configured to perform the actions of the methods, encoded on computer storage devices.

Implementations of the present disclosure provide one or more of the following technical advantages and/or improvements compared to traditional systems. By automatically launching workflow(s) in response to detected signals, implementations provide a user device that is less susceptible than traditional devices to errors in navigation in an application executing on the user device. Implementations also provide a better user experience for users using a user device (e.g., a small, mobile device) to access information via an application executing on the user device. In some examples, implementations of the present disclosure enable device-based workflows to be executed even with devices with limited functionality (e.g., mobile devices having limited interface functionality as compared to larger devices). In some examples, implementations of the present disclosure enable device-based workflows to be executed even with devices with limited screen-size (e.g., mobile devices having limited display area as compared to larger devices). Moreover, implementations also enable application providers to create new access point(s) to surface deeply nested functionalities in the application. Such access point(s) are presented in response to detected signals, and the access point(s) enable to user to readily access the functionalities that may otherwise require multiple steps of navigation and/or knowledge of the application architecture. Accordingly, implementations provide for more efficient use of processing capacity, network bandwidth, storage space, active memory, and/or other computing resources compared to traditional systems which may consume such computing resources in recovering from errors in navigation and/or in performing a greater number of navigation steps compared to the implementations described herein.

It is appreciated that methods in accordance with the present disclosure can include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DETAILED DESCRIPTION

Figure 1:
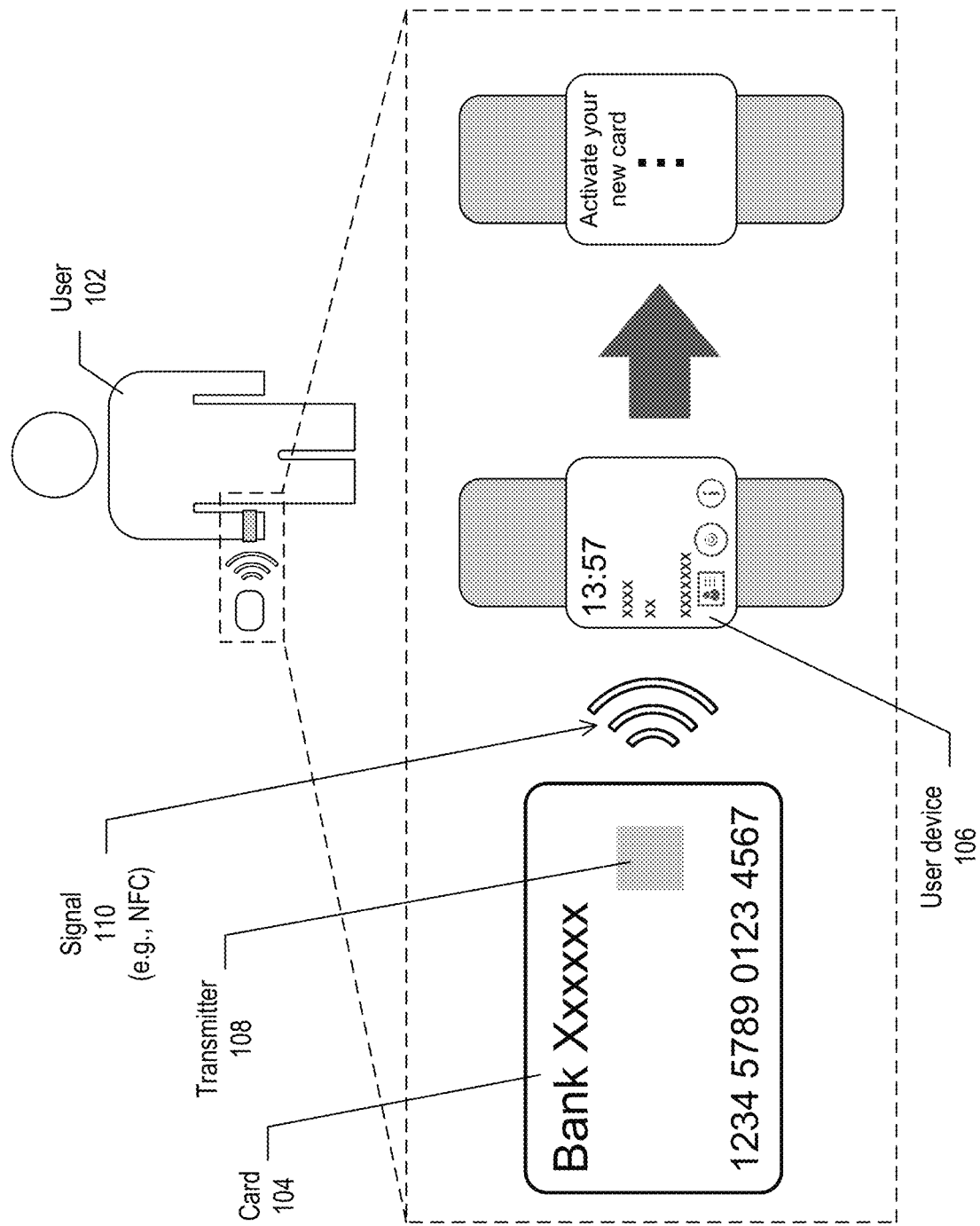
FIG. 1 depicts an example system for automatically launching an application workflow in response to detecting a signal, according to implementations of the present disclosure.

Implementations of the present disclosure are directed to systems, devices, methods, and computer-readable media for automatically launching a workflow in an application executing on a computing device in response to detecting a signal at a transceiver of the computing device. In some implementations, an application such as a mobile application is configured to interface with a near field communication (NFC) transceiver or other radio-frequency transceiver on a computing device such as a mobile device (e.g., smartphone, tablet computer, wearable device, etc.). In some examples, the transceiver may receive a signal emitted by a radio-frequency transmitter included in a card such as a payment card. In some examples, the card is a credit card, debit card, bank card, business rewards card, gift card, or any other appropriate form of payment that enables the transfer of funds or other types of value. Implementations of the present disclosure also support the use of cards other than payment cards.

In response to receiving the signal, the transceiver of the computing device may provide the information in the signal to the mobile application. For example, the card may include a NFC chip that emits a signal, and the presence of the signal (e.g., at a detectable signal level) may indicate that the card is in proximity to the mobile device. In some examples, the card may be brought into proximity to (e.g., tapped against) the mobile device by a user. The transmitter may transmit an identifier (ID) of the card, which is received by the mobile application via the transceiver of the mobile device. The mobile application may automatically launch a particular workflow in the mobile application based on the presence of the signal and/or based on the particular card ID transmitted in the signal. In some implementations, the workflow is a device-based workflow requiring one or more devices to be executed. For example, at least a portion of the workflow may include any number of screens to perform card servicing functions or other customer services through the mobile application. For example, a tap of the card against the mobile device may cause the application to launch a card activation workflow, if the card is not already activated. If the card was previously activated, the tap may cause the application to launch a workflow to enable the user to view an account balance, transaction history, or other information associated with the card account.

Using traditional computing systems, it may be cumbersome for a user to navigate an application to perform card servicing functions on smaller devices (e.g., wearable devices, smartphones, or other mobile devices with limited display capabilities and/or functionality as compared to laptop and/or desktop computers). For example, using a traditional system, the user may be required to navigate several levels deep into the application and have knowledge of the application's structure in order to perform financial services operations such as card activation and balance inquiries. Such navigation may be difficult on a wearable device or other mobile device with a small form factor. Implementations of the present disclosure enable execution of an application that is easier on such devices by, for example, automatically launching a workflow when the user taps a card against the device, reducing the number of steps and the need to navigate complex entry points on a small device.

In some examples, a workflow may include one or more screens, windows, frames, or other containers for displaying elements in a user interface (UI) of an application. A workflow may also include any number of UI elements in any number of containers. The UI elements may present text, images, video, audio, graphics, or other types of content. The UI elements may also include controls that enable a user to interact with the application, such as text entry fields, selectable lists, menus, buttons, selectable images or graphics, or other types of controls. In some examples, a workflow is a single screen, window, frame, or other container that presents any number of UI elements. In some examples, a workflow includes multiple screens, windows, frames, or other containers, and at least some of the UI elements may enable a user to navigate from screen to screen within the application.

An application may be a web application configured to execute at least partly in a web browser or in an object configured to present web content, such as an object instance of a WebView class or a UIWebView class. In some examples, the application may be a native application that is designed to execute within a hardware and/or software configuration of a computing device. The application may be configured according to any programming language, including compiled languages, interpreted languages, scripting languages, and so forth. The application may be configured to provide any type of service to the user. In some examples, the application is a financial services application provided by a financial institution such as a bank, credit union, investment brokerage, insurance company, and so forth.

A tap of the card against the user device may include the card coming into physical contact with a portion of the user device. A tap may also include the card coming into proximity with the user device, such that the signal emitted by the transmitter in the card is detectable by a transceiver of the user device. The proximity range for signal detection may depend on the strength or level of the signal emitted by the transmitter as well as the sensitivity or other characteristic(s) of the transceiver in the user device.

FIG. 1 depicts an example system for automatically launching an application workflow in response to detecting a signal, according to implementations of the present disclosure. In the example of FIG. 1, a user 102 is wearing, carrying, or otherwise in the presence of a user device 106. Although FIG. 1 depicts an example in which the user device 106 is a wearable computing device (e.g., a smartwatch), implementations support user devices 106 that are any type of computing device, such as a smartphone, tablet computer, laptop computer, in-vehicle computing system, and so forth. The user device 106 may be a mobile device or portable device such as a smartphone, tablet, wearable device, and so forth. The user device 106 may also be a less portable device such as a desktop computer, laptop computer, smart appliance, internet-of-things (IoT) device, and so forth. The user 102 may have a card 104 such as a payment card, and the card 104 may include a transmitter 108. In some examples, the transmitter 108 is embedded in, affixed to, or otherwise (e.g., permanently) incorporated into the physical structure of the card 104. In some examples, the transmitter 108 may be included in a sticker or other object that is affixed to the card 104 such that the user 102 may remove the transmitter 108 from the card 104. In some examples, the transmitter 108 may be physically separate from, but associated with, the card 104. For example, the card 104 may be mailed to the user 102 with various papers and the transmitter 108 may be included in the envelope with the card 104.

The transmitter 108 may be configured to emit a signal 110. In some implementations, the signal 110 is a radio-frequency signal. The signal 110 may also be within any other frequency ranges of the electromagnetic (EM) spectrum, such as visible light, infrared, and so forth. Implementations also support signals 110 that are non-EM signals, such as audio emissions or other types of pressure waves. In some implementations, the transmitter 108 actively emits the signal 110 regardless of other signal(s) received at the transmitter 108. In some implementations, the transmitter 108 may emit the signal 110 in response to detecting a radio-frequency signal or other type of input signal at the card 104. For example, the transmitter 108 may emit a NFC signal 110 that is configured according to any version of a NFC specification. In another example, the transmitter 108 may emit a BlueTooth™ signal 110 that is arranged according to any version of a BlueTooth™ or BlueTooth™ Low Energy (LE) specification. In response to the detection of the signal 110 at the user device 106, software executing on the user device 106 may alter its state, as described further with reference to FIG. 2. As shown in the example of FIG. 1, an application executing on the user device 106 has launched a new card activation workflow in response to the detected signal 110.

Figure 2:
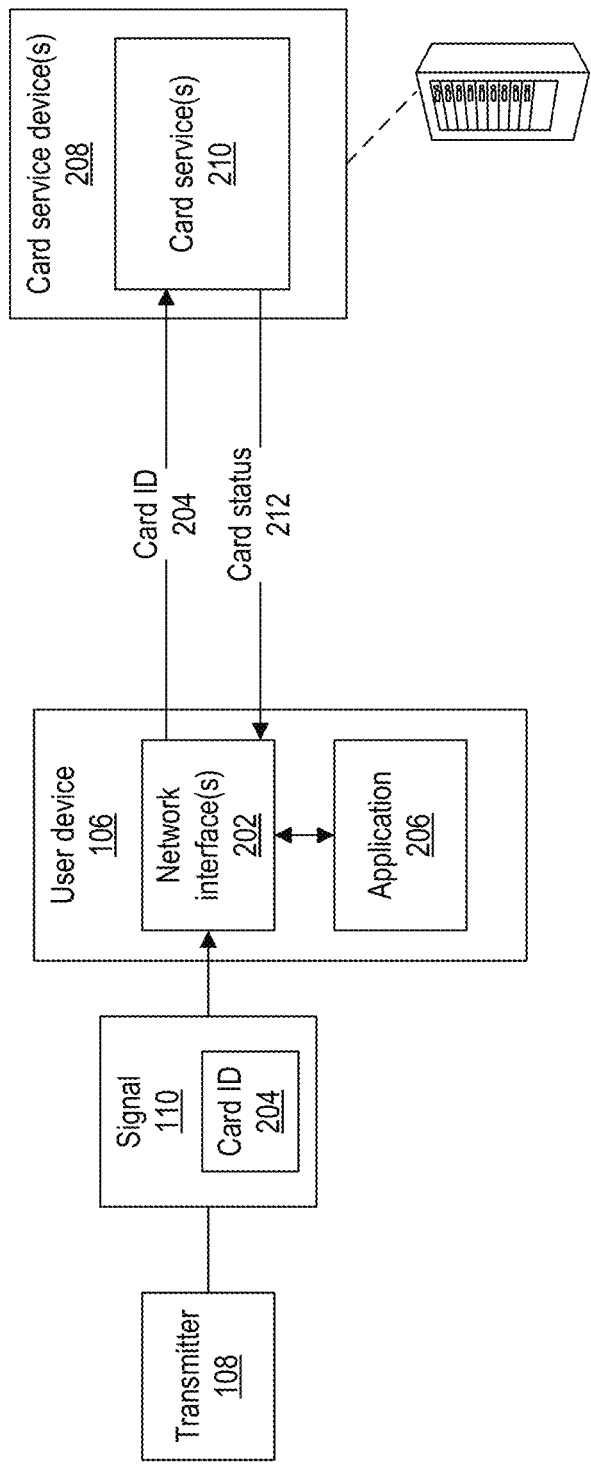
FIG. 2 depicts an example system for automatically launching an application workflow in response to detecting a signal, according to implementations of the present disclosure.

FIG. 2 depicts an example system for automatically launching an application workflow in response to detecting a signal 110, according to implementations of the present disclosure. As shown in FIG. 2, the signal 110 may encode or otherwise include a card identifier (ID) 204. In some implementations, the transmitter 108 may transmit a card ID 204 of the card 104 that is the card number itself (e.g., a 16 digit credit card number). In some implementations, the transmitter 108 may transmit a card ID 204 that is different than the card number but that corresponds (e.g., uniquely) to the card 104. In some examples, the card ID 204 may be associated with the card number in a table or other data structure stored on a back-end server, such as the card service device(s) 208.

The user device 106 may include one or more network interface(s) 202, which may also be described as a network interface controller (NIC) or transceiver. In some examples, the network interface(s) 202 may include a NFC receiver and/or transceiver. On receiving the signal 110 through the network interface(s) 202, the application 206 may access the card ID 204 encoded in the signal 110. The application 206 may cause another signal to be communicated to one or more card service(s) 210 executing on one or more card service device(s) 208. In some implementations, the application 206 may communicate the card ID 204 to the card service(s) 210. Such communications may occur over one or more wired and/or wireless networks (not shown), such as the internet or other wide area network (WAN). The card service device(s) 208 may include any type of computing device(s), such as a server computer, a distributed computing device (e.g., cloud server), network server, and so forth.

In some implementations, the application 206 may also communicate information identifying a user 102 who is currently logged into the application 206. The card service(s) 210 may verify that the card ID 204 corresponds to a card 104 that is associated with the authenticated current user 102 of the application 206. The card service(s) 210 may also verify that the communication is received from a user device 106 that is associated with the user 102, to prevent fraudulent transactions. If the card ID 204 corresponds to a card 104 that is associated with the user 102, and the user device 106 is known to be associated with the user 102, the card service(s) 210 may respond to indicate that the application 206 may proceed to present an appropriate workflow. In some implementations, the card service(s) 210 may respond with a card status 212 indicating a current status of the card 104, such as whether the card has been activated or has yet to be activated.

In some implementations, the transmitter 108 may also emit other data or metadata in addition to the card ID 204 in the same signal 110 or other signal(s). For example, the transmitter 108 may be configured to emit a signal 110 that includes other information, such as a particular launch point. The launch point may be formatted as a uniform resource identifier (URI), such as a uniform resource locator (URL) or uniform resource name (URN). The application 206 may be configured to respond to a particular URI received at the network interface(s) 202. For example, in response to detecting the URI, the application 206 may perform certain actions such as launching a workflow or sending a communication to the server to verify the card ID 204 and request instructions for which workflow to launch. In some examples, the application 206 may present content that is available at the URI, such as one or more particular web page(s).

Figure 3:
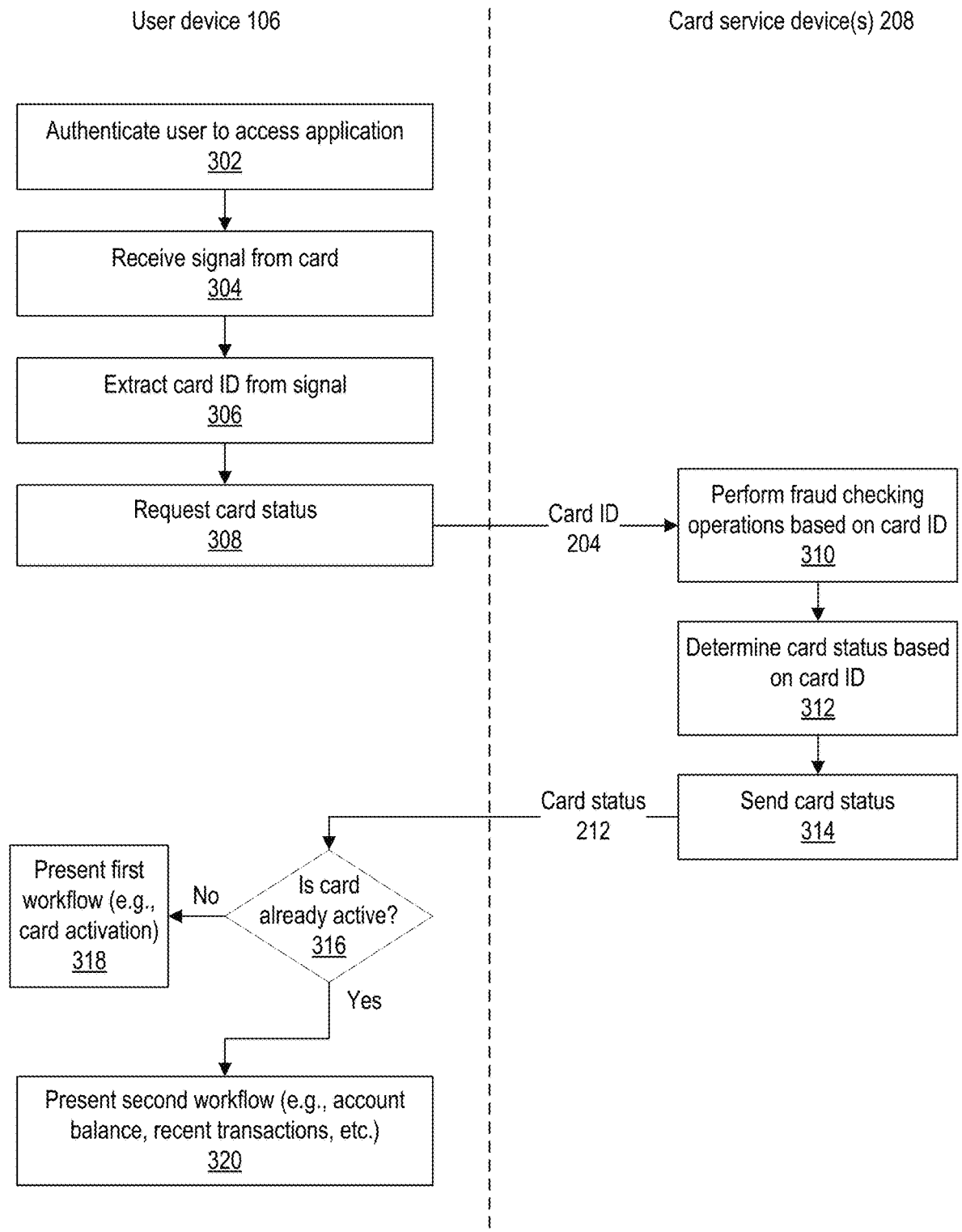
FIG. 3 depicts a flow diagram of an example process for automatically launching an application workflow in response to detecting a signal, according to implementations of the present disclosure.

FIG. 3 depicts a flow diagram of an example process for automatically launching an application workflow in response to detecting a signal 110, according to implementations of the present disclosure. Operations of the process may be performed by the network interface(s) 202, the application 206, the card service(s) 210, or other software module(s) executing on the user device 106, the card service device(s) 208, or elsewhere.

In some implementations, a user 102 is authenticated (302) to login and access information through the application 206. Authentication may include verifying user-provided credentials such as one or more of a login name, password, personal identification number (PIN), answer(s) to knowledge-based questions (e.g., what is your maternal grandfather's middle name?), and so forth. Authentication may also include collecting biometric data from the user 102 and verifying that the collected biometric data corresponds to previously collected data from the user 102. Biometric data may include fingerprint(s), image(s) or video of the user's face, audio recordings of the user's voice, and so forth. In some implementations, authentication may include one or more round trip communications with the card service device(s) 208 to verify the user's credential(s) and/or biometric data.

A signal 110 may be received (304) at the user device 106, by network interface(s) 202. In some examples, the signal 110 may be emitted from a transmitter 108 associated with the card 104 as described above. The signal 110 may include a card ID 204, and the card ID 204 may be extracted (306) from the signal 110 or otherwise determined based on the information in the signal 110. On determining that the signal 110 has been received, the application 206 may request (308) a card status 212 from the card service(s) 210. In some implementations, the application 206 may send a request to the card service(s) 210, the request including the card ID 204.

In some implementations, the card service(s) 210 may perform (310) various fraud checking operation(s) based on the card ID 204 and/or other information included in the communication from the user device 106. In some examples, the communication may include context information such as a current location of the user device 106, the current user 102 logged into the application 206, and/or a device ID of the user device 106. The fraud checking operations may check that the location is within a range of locations that is typical for the user 102 and/or the user device 106. A current location that is outside the typical range may indicate a possible fraudulent use of the user device 106 and/or application 206. Location may be determined based on a satellite-based navigation component of the user device 106, such as a global positioning system (GPS) receiver, or using other techniques. The fraud checking operations may check that the device ID is that of a user device 106 previously registered or used by the user 102. A different device ID may indicate possible fraud. The device ID may be a media access control (MAC) address or Ethernet Hardware Address (EHA) of the user device 106, an internet protocol (IP) address of the user device 106, or other device ID that (e.g., uniquely) identifies the user device 106 among multiple devices. If the card service(s) 210 determine possible fraud, the request for card status 212 may be denied and/or the user 102 may be prompted to provide further authentication information to ensure the user 102 is authorized to use the card 104, the user device 106, and/or the application 206.

The card status 212 of the card 104 may be determined (312) based on the card ID 204. In some examples, the card status 212 may indicate that the card 104 is currently active, such that it may be used for transactions. Alternatively, the card status 212 may indicate that the card 104 is currently inactive, such that it may not yet be used for transactions. The card status 212 may be sent (314) to the application 206. Based on the card status 212, the application 206 may determine (316) whether the card 104 is already active. If not, the application 206 may present (318) a first workflow in the UI of the application 206. The first workflow may be a card activation workflow that enables the user 102 to specify information to activate the card 104. In some examples, the card activation workflow may automatically send a message to the card service(s) 210 to activate the card 104 without any further information provided by the user 102. If it is determined that the card 104 is already active, the application 206 may present (320) a second workflow in the UI of the application 206. The second workflow may enable the user 102 to view account information such as current account balance, recent transaction(s), and so forth.

In some examples, the card service(s) 210 may determine that the card 104 is a new card 104 that has been sent to the user 102, such that the card 104 needs to be activated for use by the user 102. In such examples, the card service(s) 210 may respond with a card status message indicating that the application 206 is to launch the new card activation workflow to guide the user 102 through the process of activating the card. In some implementations, the tap of an un-activated card 104 on the user device 106 may prompt the application 206 to send a message to the card service(s) 210 to activate the card 104, without any further interaction by the user 102. If the card service(s) 210 determine that the card 104 has previously been activated, the card service(s) 210 may respond with a message indicating that the application 206 is to launch a different flow. For example, in response to the tap of an activated card 104, the application 206 may present screens displaying the current balance of the card account, recent transaction(s), previous payment(s), next payment due, or other account information.

In some implementations, the application 206 may include a feature to enable a user 102 to personalize the behavior of the application 206 in response to a tap of the card 104. For example, the user 102 may personalize the application 206 to show account balance in response to a card tap. The application 206 may also enable the user to personalize (e.g., enable or disable) whether the application 206 launches a workflow automatically in response to detecting a signal 110, or whether the user 102 is prompted to allow or disallow the workflow launch in response to the signal 110. In some implementations, instead of making a call to the card service(s) 210 to determine which workflow to launch, the signal 110 may include a URL or other launch point to indicate which workflow to present in the application 206.

Figure 4:
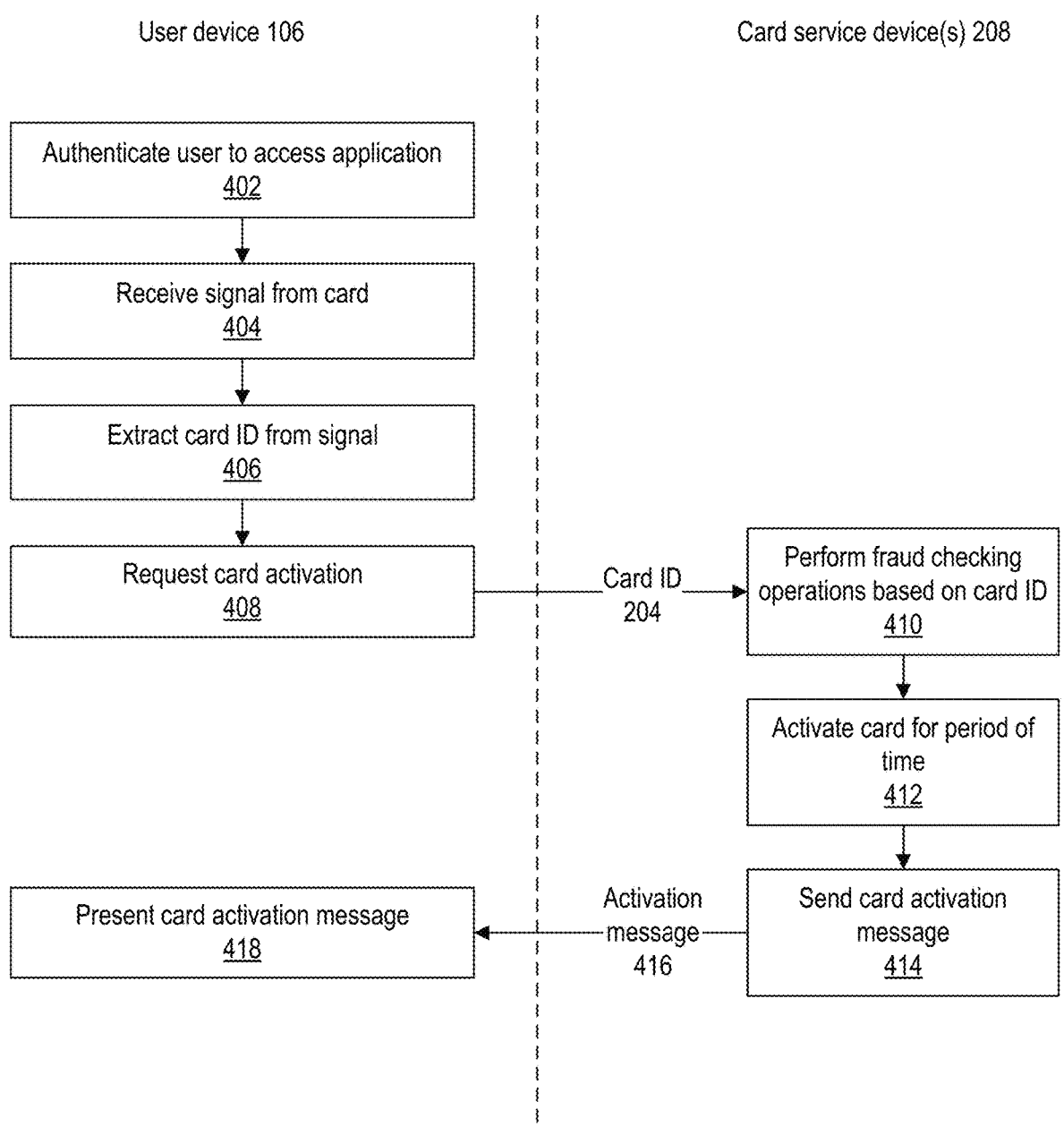
FIG. 4 depicts a flow diagram of an example process for payment card activation, according to implementations of the present disclosure.

FIG. 4 depicts a flow diagram of an example process for card activation, according to implementations of the present disclosure. Operations of the process may be performed by the network interface(s) 202, the application 206, the card service(s) 210, or other software module(s) executing on the user device 106, the card service device(s) 208, or elsewhere.

The user 102 may be authenticated (402) to access the application 206, the signal 110 may be received (404), and the card ID 204 may be extracted (406) from the signal 110, as described above with reference to 302, 304, and 306 respectively. The application 206 may send a communication to the card service(s) 210 to request (408) card activation. The communication may include the card ID 204. On receiving the communication, the card service(s) 210 may perform (410) various fraud checking operations as described with reference to 310. If the fraud checking operation(s) do not identify possible fraud, the card service(s) 210 may activate (412) the card 104 for a period of time, and send (414) a card activation message 416 to the user device 106. The application 206 may present (418) the card activation message 416 in the UI of the application 206 to notify the user 102 that the card 104 may be used for the period of time.

In some implementations, the workflow presented in the application 206 may be based at least partly on contextual information. For example, if the location of the user device 106 outside its normal range of locations or territory, the card service(s) 210 may instruct the application 206 to launch a travel notification workflow to enable the user 102 to indicate that they are travelling, their expected destination, the duration of the travel, or other information. As in the example of FIG. 4, the determination that the user 102 is travelling may cause the card service(s) 210 to disable the card 104 by default. If the user 102 wishes to use the card 104 for a transaction while travelling, the user 102 may tap the card 104 against the user device 106. This tap may cause the activation of the card 104 for a period of time (e.g., 5 minutes, 15 minutes, etc.) to enable the user 102 to complete the current transaction using the card 104. Placing the card 104 into an inactive state by default, and activating the card 104 for a short period of time per transaction, may prevent the card 104 from being used if it is lost or stolen during the user's travels.

The tap may allow the card service(s) 210 to determine that the card 104 is physically with the user 102, and the card 104 may be activated for use for the period of time following the tap. The tap-to-use feature may be activated manually by the user 102, or automatically activated under certain circumstances (e.g., when the user 102 is travelling). In some implementations, the user 102 may set preferences in the application 206 to determine when or under what circumstances the card 104 is generally disabled until tap, or generally enabled. The tap-to-use feature may also be automatically activated if possible fraud is detected (e.g., based on an unusual location, device, or usage pattern), to require the user 102 to prove that the card 104 is in their physical presence before authorizing a charge.

As another example, if the current location of the user device 106 is determined to be at a store, the application 206 may respond to a tap by launching a workflow to present the current account balance instead of other information, to enable the user 102 to determine whether their account holds sufficient funds for a purchase. Location information may be stored on the card service device(s) 208, and used subsequently to determine whether subsequent transactions are possibly fraudulent. For example, if the card 104 is tapped to the user device 106 in Texas, but a transaction request is detected from a store in New York, that transaction may be flagged as possibly fraudulent, assuming that the store location can be accurately determined based on the network address associated with the transaction.

Figure 5:
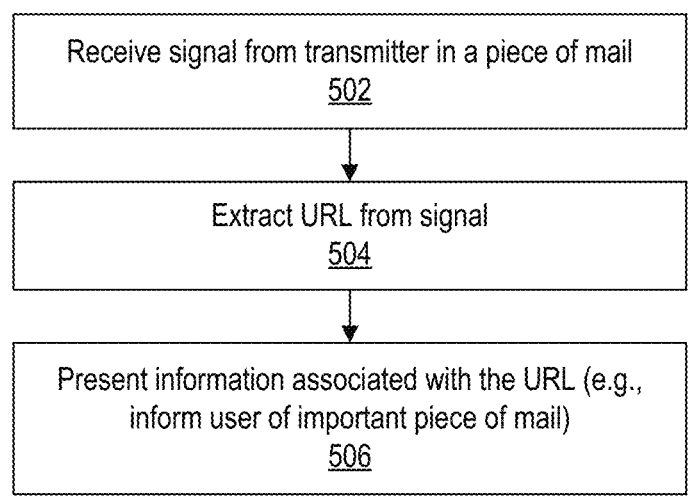
FIG. 5 depicts a flow diagram of an example process for automatically launching an application workflow in response to detecting a signal, according to implementations of the present disclosure.

FIG. 5 depicts a flow diagram of an example process for automatically launching an application workflow in response to detecting a signal 110, according to implementations of the present disclosure. Operations of the process may be performed by the network interface(s) 202, the application 206, the card service(s) 210, or other software module(s) executing on the user device 106, the card service device(s) 208, or elsewhere.

The signal 110 may be received (502) by the network interface(s) 202 of the user device 106. In some examples, the signal 110 may be emitted from a transmitter 108 included in a piece of mail, such as an envelope, a parcel, a postcard, and so forth. A URL may be extracted (504) from the signal 110, and the application 206 may present (506) information associated with the URL. For example, the application 206 may navigate to the URL and load one or more pages of information available at the URL. In some examples, a letter or other piece of physical mail may be sent to user 102, and the mail may include an iBeacon or other type of Bluetooth™ LE transmitter 108. The Bluetooth™ transceiver or other network interface(s) 202 on the user device 106 may detect a signal 110 sent from the transmitter 108 and the application 206 may launch a workflow in response to the signal 110. For example, an important or time-sensitive letter such as a new card mailer may include a transmitter chip, and the application 206 may respond to the signal 110 by presenting a screen to inform the user 102 that important new mail has been received. This may help the user 102 avoid throwing away letters that include a payment card, letters that require a customer signature, time-sensitive mail, or other important mail that may otherwise be perceived as junk mail by the user 102. A letter may include a LE transmitter that has longer range or signal strength than a standard NFC transmitter, to enable signal detection even if the user device 106 is up to several meters away from the mail. In some examples, the signal 110 transmitted by the transmitter 108 included in the card 104 or a piece of mail may be encrypted or otherwise secured such that the application 206 is able to decrypt the signal 110 but other unauthorized processes are not able extract information from the signal 110.

In some implementations, the application 206 may be configured to detect and respond to the tap of another user's card to a user device 106. For example, a funds transfer workflow from userA to userB may be launched in response to detecting the tap of userA's card to userB's user device 106, if userB has configured their account to specify userA as a friend or contact for authorized funds transfers, and/or vice versa.

Figure 6:
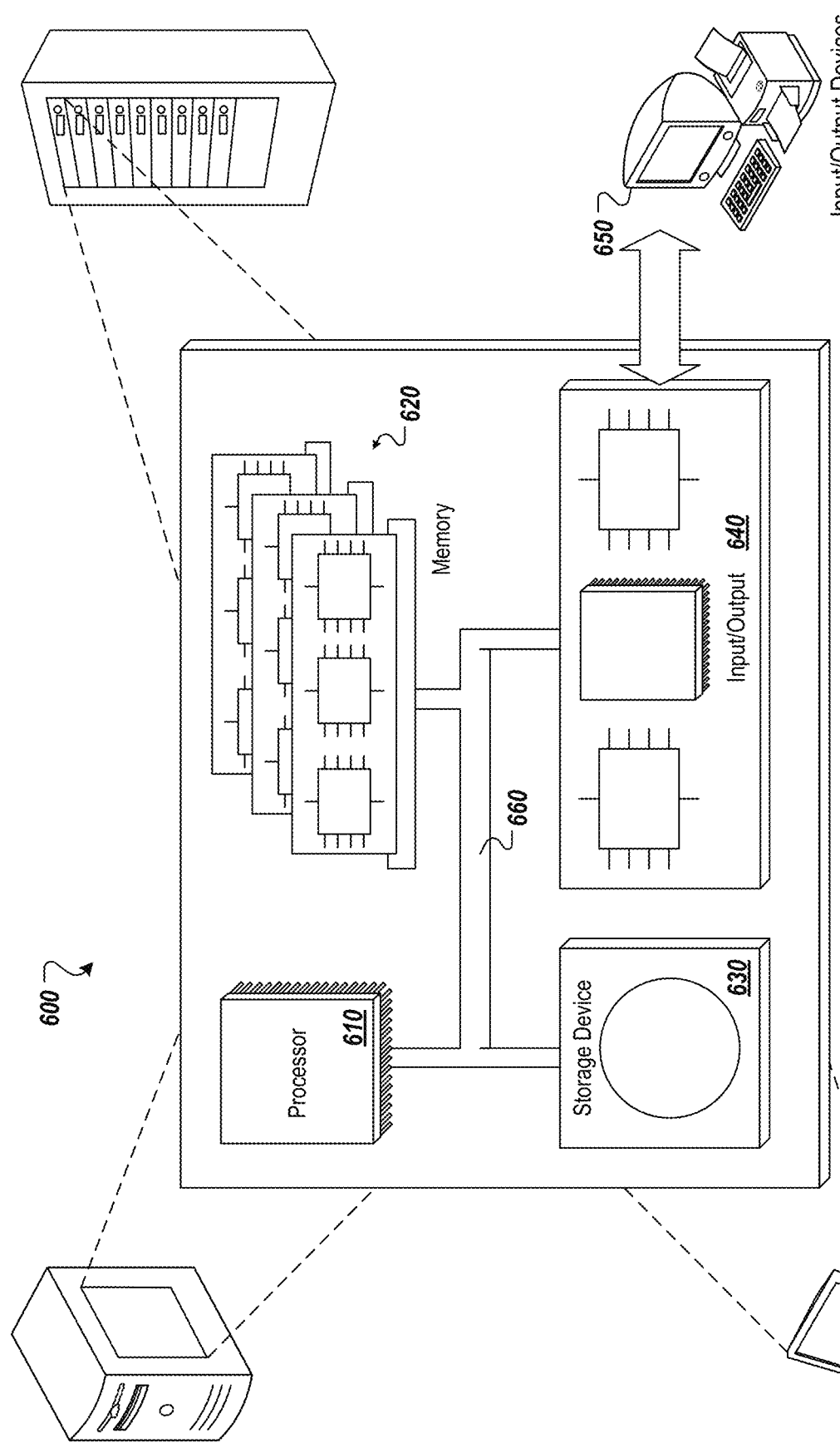
FIG. 6 depicts an example computing system, according to implementations of the present disclosure.

FIG. 6 depicts an example computing system, according to implementations of the present disclosure. The system 600 may be used for any of the operations described with respect to the various implementations discussed herein. For example, the system 600 may be included, at least in part, in one or more of the user device 106 or the card service device(s) 208 described herein. The system 600 may include one or more processors 610, a memory 620, one or more storage devices 630, and one or more input/output (I/O) devices 650 controllable via one or more I/O interfaces 640. The various components 610, 620, 630, 640, or 650 may be interconnected via at least one system bus 660, which may enable the transfer of data between the various modules and components of the system 600.

The processor(s) 610 may be configured to process instructions for execution within the system 600. The processor(s) 610 may include single-threaded processor(s), multi-threaded processor(s), or both. The processor(s) 610 may be configured to process instructions stored in the memory 620 or on the storage device(s) 630. The processor(s) 610 may include hardware-based processor(s) each including one or more cores. The processor(s) 610 may include general purpose processor(s), special purpose processor(s), or both.

The memory 620 may store information within the system 600. In some implementations, the memory 620 includes one or more computer-readable media. The memory 620 may include any number of volatile memory units, any number of non-volatile memory units, or both volatile and non-volatile memory units. The memory 620 may include read-only memory, random access memory, or both. In some examples, the memory 620 may be employed as active or physical memory by one or more executing software modules.

The storage device(s) 630 may be configured to provide (e.g., persistent) mass storage for the system 600. In some implementations, the storage device(s) 630 may include one or more computer-readable media. For example, the storage device(s) 630 may include a floppy disk device, a hard disk device, an optical disk device, or a tape device. The storage device(s) 630 may include read-only memory, random access memory, or both. The storage device(s) 630 may include one or more of an internal hard drive, an external hard drive, or a removable drive.

One or both of the memory 620 or the storage device(s) 630 may include one or more computer-readable storage media (CRSM). The CRSM may include one or more of an electronic storage medium, a magnetic storage medium, an optical storage medium, a magneto-optical storage medium, a quantum storage medium, a mechanical computer storage medium, and so forth. The CRSM may provide storage of computer-readable instructions describing data structures, processes, applications, programs, other modules, or other data for the operation of the system 600. In some implementations, the CRSM may include a data store that provides storage of computer-readable instructions or other information in a non-transitory format. The CRSM may be incorporated into the system 600 or may be external with respect to the system 600. The CRSM may include read-only memory, random access memory, or both. One or more CRSM suitable for tangibly embodying computer program instructions and data may include any type of non-volatile memory, including but not limited to: semiconductor memory devices, such as EPROM, EEPROM, and flash memory devices; magnetic disks such as internal hard disks and removable disks; magneto-optical disks; and CD-ROM and DVD-ROM disks. In some examples, the processor(s) 610 and the memory 620 may be supplemented by, or incorporated into, one or more application-specific integrated circuits (ASICs).

The system 600 may include one or more I/O devices 650. The I/O device(s) 650 may include one or more input devices such as a keyboard, a mouse, a pen, a game controller, a touch input device, an audio input device (e.g., a microphone), a gestural input device, a haptic input device, an image or video capture device (e.g., a camera), or other devices. In some examples, the I/O device(s) 650 may also include one or more output devices such as a display, LED(s), an audio output device (e.g., a speaker), a printer, a haptic output device, and so forth. The I/O device(s) 650 may be physically incorporated in one or more computing devices of the system 600, or may be external with respect to one or more computing devices of the system 600.

The system 600 may include one or more I/O interfaces 640 to enable components or modules of the system 600 to control, interface with, or otherwise communicate with the I/O device(s) 650. The I/O interface(s) 640 may enable information to be transferred in or out of the system 600, or between components of the system 600, through serial communication, parallel communication, or other types of communication. For example, the I/O interface(s) 640 may comply with a version of the RS-232 standard for serial ports, or with a version of the IEEE 1284 standard for parallel ports. As another example, the I/O interface(s) 640 may be configured to provide a connection over Universal Serial Bus (USB) or Ethernet. In some examples, the I/O interface(s) 640 may be configured to provide a serial connection that is compliant with a version of the IEEE 1394 standard.

The I/O interface(s) 640 may also include one or more network interfaces, such as network interface(s) 202, that enable communications between computing devices in the system 600, or between the system 600 and other network-connected computing systems. The network interface(s) may include one or more network interface controllers (NICs) or other types of transceiver devices configured to send and receive communications over one or more networks using any network protocol.

Computing devices of the system 600 may communicate with one another, or with other computing devices, using one or more networks. Such networks may include public networks such as the internet, private networks such as an institutional or personal intranet, or any combination of private and public networks. The networks may include any type of wired or wireless network, including but not limited to local area networks (LANs), wide area networks (WANs), wireless WANs (WWANs), wireless LANs (WLANs), mobile communications networks (e.g., 3G, 4G, Edge, etc.), and so forth. In some implementations, the communications between computing devices may be encrypted or otherwise secured. For example, communications may employ one or more public or private cryptographic keys, ciphers, digital certificates, or other credentials supported by a security protocol, such as any version of the Secure Sockets Layer (SSL) or the Transport Layer Security (TLS) protocol.

The system 600 may include any number of computing devices of any type. The computing device(s) may include, but are not limited to: a personal computer, a smartphone, a tablet computer, a wearable computer, an implanted computer, a mobile gaming device, an electronic book reader, an automotive computer, a desktop computer, a laptop computer, a notebook computer, a game console, a home entertainment device, a network computer, a server computer, a mainframe computer, a distributed computing device (e.g., a cloud computing device), a microcomputer, a system on a chip (SoC), a system in a package (SiP), and so forth. Although examples herein may describe computing device(s) as physical device(s), implementations are not so limited. In some examples, a computing device may include one or more of a virtual computing environment, a hypervisor, an emulation, or a virtual machine executing on one or more physical computing devices. In some examples, two or more computing devices may include a cluster, cloud, farm, or other grouping of multiple devices that coordinate operations to provide load balancing, failover support, parallel processing capabilities, shared storage resources, shared networking capabilities, or other aspects.

Implementations and all of the functional operations described in this specification may be realized in digital electronic circuitry, or in computer software, firmware, or hardware, including the structures disclosed in this specification and their structural equivalents, or in combinations of one or more of them. Implementations may be realized as one or more computer program products, i.e., one or more modules of computer program instructions encoded on a computer readable medium for execution by, or to control the operation of, data processing apparatus. The computer readable medium may be a machine-readable storage device, a machine-readable storage substrate, a memory device, a composition of matter effecting a machine-readable propagated signal, or a combination of one or more of them. The term "computing system" encompasses all apparatus, devices, and machines for processing data, including by way of example a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) may be written in any appropriate form of programming language, including compiled or interpreted languages, and it may be deployed in any appropriate form, including as a standalone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any appropriate kind of digital computer. Generally, a processor may receive instructions and data from a read only memory or a random access memory or both. Elements of a computer can include a processor for performing instructions and one or more memory devices for storing instructions and data. Generally, a computer may also include, or be operatively coupled to receive data from or transfer data to, or both, one or more mass storage devices for storing data, e.g., magnetic, magneto optical disks, or optical disks. However, a computer need not have such devices. Moreover, a computer may be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in, special purpose logic circuitry.

To provide for interaction with a user, implementations may be realized on a computer having a display device, e.g., a CRT (cathode ray tube) or LCD (liquid crystal display) monitor, for displaying information to the user and a keyboard and a pointing device, e.g., a mouse or a trackball, by which the user may provide input to the computer. Other kinds of devices may be used to provide for interaction with a user as well; for example, feedback provided to the user may be any appropriate form of sensory feedback, e.g., visual feedback, auditory feedback, or tactile feedback; and input from the user may be received in any appropriate form, including acoustic, speech, or tactile input.

Implementations may be realized in a computing system that includes a back end component, e.g., as a data server, or that includes a middleware component, e.g., an application server, or that includes a front end component, e.g., a client computer having a graphical user interface or a web browser through which a user may interact with an implementation, or any appropriate combination of one or more such back end, middleware, or front end components. The components of the system may be interconnected by any appropriate form or medium of digital data communication, e.g., a communication network. Examples of communication networks include a local area network ("LAN") and a wide area network ("WAN"), e.g., the Internet.

The computing system may include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the disclosure or of what may be claimed, but rather as descriptions of features specific to particular implementations. Certain features that are described in this specification in the context of separate implementations may also be implemented in combination in a single implementation. Conversely, various features that are described in the context of a single implementation may also be implemented in multiple implementations separately or in any suitable subcombination. Moreover, although features may be described above as acting in certain combinations and even initially claimed as such, one or more features from a claimed combination may in some examples be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products.

A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claims.

What is claimed is:

1. A computer-implemented method performed by at least one processor, the method comprising:
   receiving, by the at least one processor, through a transceiver component of a user device associated with a user of a physical payment card, a signal from a chip in the physical payment card, wherein the signal includes a card identifier (ID) of the payment card, wherein:
      the signal is transmitted from a radio-frequency transmitter included in the payment card, or
      the signal is transmitted from a near field communication (NFC) transmitter included in the payment card;
   determining, by the at least one processor, the card ID from the signal;
   verifying that the payment card and the user device are associated with the user;
   receiving, by the at least one processor, a status of the payment card corresponding to the card ID;
   based at least partly on the status of the payment card, presenting, by the at least one processor, a workflow in an application executing on the user device; and
   responsive to the status of the payment card being currently inactive: presenting a card activation workflow, wherein use of the card activation workflow causes the status of the payment card to transition from inactive to active.

2. The method of claim 1, wherein presenting the workflow further comprises presenting an account information workflow responsive to the status of the payment card being currently active.

3. The method of claim 1, further comprising:
   sending a status request to a card service executing remotely, the status request including the card ID;
   wherein the status is provided by the card service in response to the status request.

4. The method of claim 1, wherein the signal is transmitted from a radio-frequency transmitter included in the payment card.

5. The method of claim 1, wherein the signal is transmitted from a near field communication (NFC) transmitter included in the payment card.

6. The method of claim 1, further comprising:
   sending, by the at least one processor, an activation request to a card service executing remotely, the activation request including the card ID; and receiving, by the at least one processor, a notification from the card service in response to the request, the notification indicating that the payment card is activated for a period of time.

7. The method of claim 6, wherein the payment card is inactive prior to sending the activation request, based on a determination that a location of the user device is outside a typical area of travel.

8. The method of claim 1, the method further comprising:
responsive to the status of the payment card being currently active: displaying a current balance of the payment card, recent transactions associated with the payment card, previous payments associated with the payment card and next payment due for the payment card.

9. The method of claim 1, wherein presenting the card activation workflow further comprises:
in response to verifying that the payment card and the user device are associated with the user, sending, by the at least one processor, an activation request to a card service executing remotely, the activation request including the card ID.

10. The method of claim 9, wherein the payment card is activated for a period of time, wherein the method further comprises notifying the user that the payment card can be used for the period of time.

11. A system comprising:
at least one processor; and
a memory communicatively coupled to the at least one processor, the memory storing instructions which, when executed by the at least one processor, cause the at least one processor to perform operations comprising:
receiving, through a transceiver component of a user device associated with a user of a physical payment card, a signal from a chip in a physical payment card, wherein the signal that includes a card identifier (ID) of the payment card, wherein:
the signal is transmitted from a radio-frequency transmitter included in the payment card, or
the signal is transmitted from a near field communication (NFC) transmitter included in the payment card;
determining the card ID from the signal;
verifying that the physical payment card and the user device are associated with the user;
receiving a status of the payment card corresponding to the card ID;
based at least partly on the status of the payment card, presenting a workflow in an executing application; and
responsive to the status of the payment card being currently inactive:
presenting a card activation workflow, wherein use of the card activation workflow causes the status of the payment card to transition from inactive to active.

12. The system of claim 11, wherein presenting the workflow further comprises presenting an account information workflow responsive to the status of the payment card being currently active.

13. The system of claim 11, the operations further comprising:
sending a status request to a card service executing remotely, the status request including the card ID,
wherein the status is provided by the card service in response to the status request.

14. The system of claim 11, wherein the signal is transmitted from a radio-frequency transmitter included in the payment card.

15. The system of claim 11, wherein the signal is transmitted from a near field communication (NFC) transmitter included in the payment card.

16. One or more non-transitory computer-readable media storing instructions which, when executed by at least one processor, cause the at least one processor to perform operations comprising:
receiving, through a transceiver component of a user device, a signal from a chip in a physical payment card, wherein the signal that includes a card identifier (ID) of the payment card;
determining the card ID from the signal;
verifying that the card ID and the user device are associated with the user;
receiving a status of the payment card corresponding to the card ID;
after the verifying and based at least partly on the status of the payment card, presenting a workflow in an application executing on the user device; and
responsive to the status of the payment card being currently inactive:
presenting a card activation workflow, wherein use of the card activation workflow causes the status of the payment card to transition from inactive to active.

17. The one or more non-transitory computer-readable media of claim 16, wherein presenting the workflow further comprises presenting an account information workflow responsive to the status of the payment card being currently active.

18. The one or more non-transitory computer-readable media of claim 16, the operations further comprising:
sending a status request to a card service executing remotely, the status request including the card ID;
wherein the status is provided by the card service in response to the status request.

19. The one or more non-transitory computer-readable media of claim 16, the operations further comprising:
sending an activation request to a card service executing remotely, the activation request including the card ID; and
receiving a notification from the card service in response to the request, the notification indicating that the payment card is activated for a period of time.

20. The one or more non-transitory computer-readable media of claim 19, wherein the payment card is inactive prior to sending the activation request, based on a determination that a location of the user device is outside a typical area of travel.

* * * * *